May 7, 1963 C W. MUSSER 3,088,333
FLUID WAVE GENERATOR FOR HARMONIC DRIVE
Filed July 3, 1961 3 Sheets-Sheet 1

*Inventor*
C. Walton Musser
By his Attorney

May 7, 1963  C W. MUSSER  3,088,333
FLUID WAVE GENERATOR FOR HARMONIC DRIVE
Filed July 3, 1961  3 Sheets-Sheet 2

May 7, 1963 C W. MUSSER 3,088,333
FLUID WAVE GENERATOR FOR HARMONIC DRIVE
Filed July 3, 1961 3 Sheets-Sheet 3

United States Patent Office 3,088,333
Patented May 7, 1963

3,088,333
FLUID WAVE GENERATOR FOR HARMONIC
DRIVE
C Walton Musser, Beverly, Mass., assignor to United Shoe Machinery Corporation, Boston, Mass., a corporation of New Jersey
Filed July 3, 1961, Ser. No. 123,086
18 Claims. (Cl. 74—640)

The present invention relates to harmonic drives in which a flexspline is deflected radially to engage its teeth against the teeth of a circular spline at a plurality of circumferentially spaced points with intermediate points at which the teeth are out of engagemnt and out of mesh. The invention relates particularly to improvements in the wave generator as it is applied to the combination.

A purpose of the invention is to reduce the inertia of the input of a wave generator.

A further purpose is to reduce the size of a motor required to drive the input of a wave generator.

A further purpose is to eliminate feedback from the output to the input in a harmonic drive.

A further purpose is to make a wave generator readily scrammable, that is, capable of instanteous release or disconnection in an emergency.

A further purpose is to permit incremental input to a wave generator.

A further purpose is to render a harmonic drive more conveniently applicable to a servo mechanism where the bulk of the energy will not be supplied by the control input, but will come from an independent source.

A further purpose is to deflect a flexspline by progressing a wave along a series of fluid actuating mechanisms, suitably cylinders and pistons, which act on the flexspline at points distributed around its circumference, the deflection being applied at the same time to a plurality of circumferentially spaced fluid actuating devices while intermediate fluid actuating devices are not energized, although they may permissibly be subjected to a lower pressure to perform a bearing function.

A further purpose is to subject the fluid actuating mechanisms which are ahead of the location where deflection is to occur to an intermediate pressure while subjecting those which are behind the location at which deflection will occur in the flexspline to a low pressure.

A further purpose is to employ balls as pistons in fluid cylinders and concurrently to utilize the balls in engagement with a race to form a non-circular and suitably an elliptoidal bearing, the balls being effectively lubricated by exposure to lubricant in the fluid cylinder.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

Figure 1:
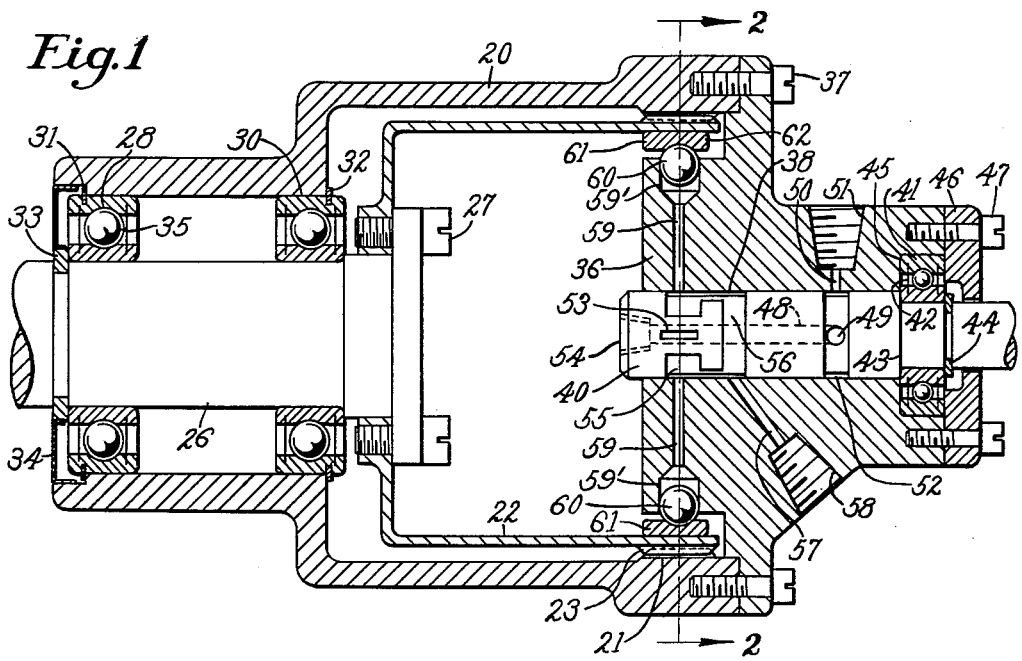
FIGURE 1 is an axial sectional view of the harmonic drive of the invention, the section being taken along the common axis of the input and output.

Describing in illustration but not in limitation and referring to the drawings:

In the case of harmonic drives as shown in my United States Patents Nos. 2,906,143; 2,931,248; 2,943,508 and 2,959,065, the wave generator which deflects the flexspline to engage the circular spline has usually been mechanical and rotated from an external source. The wave has ordinarily been generated by providing an elliptoidal shape on the interior portion of a ball or roller bearing and then rotating the inner race to cause the shape of the outer race to rotate. This rotation of the shape produces what may be described generally as a sine wave, which wave circumferentially progresses around the outer race of the bearing as the inner race is rotated. Since the outer race has usually been in close contact with the flexspline of the harmonic drive, it has caused circumferential progression of the sine wave around the flexspline. As is now well known, this causes the teeth near the peak of the wave to be intermeshed and in contact with the teeth of a circular spline. At the same time the teeth at the bottom of the wave are disengaged and are free to pass one another. When the shape of the initial race is elliptoidal, there are two sine waves per 360° and the peak of the sine wave corresponds to the major axis of the elliptoid while the valley of the sine wave corresponds to the minor axis of the elliptoid. Variations in wave generators have been described, usually employing ball or roller bearings or plain bearings in mechanical devices. My United States Patent No. 2,906,143 also describes an electromagnetic wave generator and refers to hydraulic and mechanical wave generators.

The present invention is concerned with a fluid actuated wave generator for a harmonic drive in which the wave progression is caused incrementally by the expansion of fluid actuating means, suitably cylinders and pistons, distributed along an otherwise circular shape which is desirably stationary.

The device of the invention can be viewed as a stationary member having a number of radial cylinders and radial pistons which by proper actuations from a valve, suitably a rotary valve, causes the pistons to produce a travelling wave in the flexspline.

One can visualize that when force is applied radially to two opposite pistons acting outwardly against the inside of the flexspline this will cause the flexspline to deflect in a generally elliptoidal shape. If now pistons which are adjacent to the set of pistons previously actuated are actuated at the same time that the pistons formerly actuated become inactive, the shape will advance or the major axis will advance to the next operative set of pistons. In this manner the shape is progressed from point to point so that it circumferentially advances.

It will, of course, be evident that depending on the desired accuracy or smoothness of the curve, the number of radial pistons can be increased.

A number of different advantages are obtained by a wave generator of this character:

(1) While a harmonic drive has many great advantages, it has one weakness which is sometimes of importance. This is the fact that the input inertia of the wave generator is usually high. This is not often of importance, but where extreme rapidity of action is necessary, then the input inertia is quite critical. Thus high input inertia is objectionable when the wave generator is driven by a small servo motor which must make rapid changes in direction or velocity. While various expedients can be adopted to reduce the input inertia, nevertheless, the output torque of the unit largely controls the diameter of the unit, as well as the diameter of the inner race of the wave generator. It therefore follows that for a unit having a sizable output torque, the input inertia has in the past been large. Since in the usual harmonic drive the entire reduction is taking place in one stage and the output torque dictates the size of the input to this stage, this constitutes a disadvantage over other gearing systems where multiple stages can be used and where the input inertia can therefore be made quite small. Reduction of the input inertia by changing the shape or configuration of the wave generator is largely limited by the requirement for the inner race. The inner race must be made so that it functions satisfactorily as a bearing and it also must have sufficient rigidity to assure that it will not grossly deflect under the radial forces applied by the output torque.

One of the great advantages of the device of the invention is that input inertia can be reduced to a very small amount. In the device of the invention the rotating input is not the wave generator itself but merely a rotary valve which influences and directs the flow of hydraulic fluid such as oil or gas so as to produce the effect of a rotating wave generator. As a consequence the rotating valve can be made very small in diameter with very small inertia.

It will therefore be seen that the invention is quite applicable to operation by a small servo motor or the like.

(2) Since the input motor to the wave generator need only rotate the rotating valve, the input motor can be very small in size and the speed of operation of the input motor is then not dictated by power considerations. In general small motors can change their direction and speed considerably faster than large motors because of the much smaller inertia of the motor rotor. In the device of the invention the actual driving force or motive power which sends the wave around the flexspline is supplied by fluid pressure. A relatively very large amount of hydraulic power is thus controlled and regulated by a small valve. Since the input motor need only actuate such a small valve, it can direct large amounts of power at a high rate of speed or change.

(3) Since the power is supplied by hydraulic pressure and is directed by a rotating valve, there can be no feedback from the output to the input. Therefore, variations in output torque will not affect the input. This again is a factor which permits the use of a very small motor to drive the input. This is especially desirable in those applications where there is a sensitive feed into an output which has large variations of torque. It will thus be evident that from this standpoint the unit of the present invention is completely irreversible and the output is locked in any position in which it is placed by the action of the input rotary valve. Hence, actual power need not be utilized to hold the unit in any position since no hydraulic fluid under pressure is being used and no holding force is needed to lock the unit in such a position. Power is required to maintain the hydraulic pressure in a practical sense but if there is no leakage in the system and the mechanism is properly controlled, there will be no flowing of hydraulic fluid in the standing condition.

(4). The wave generator of the invention can easily be made scrammable, that is, it can be positioned so that the flexspline teeth will radially clear the circular spline teeth. Therefore, to make the device scrammable it is merely necessary to release the deflecting pressure so that the flexspline will become undeflected. Then with the hydraulic pressure released, none of the opposite pistons will cause deflection of the flexspline, and the flexspline will be free to rotate independently of the circular spline. Consequently, if it is desired to release one of the spline elements from the other, it is only necessary to release the hydraulic pressure. As soon as the hydraulic pressure is again supplied, the teeth will interengage and the two splines will be splined together and subject to rotation one with the other upon circumferential progression of the wave.

(5) In many instances it is desirable to control a device by a stepping motor instead of a constantly running motor. This may be done when an incremental rotational adjustment is desirable or when the incremental motion of the output is so small as to be unobjectionable in view of the high ratio. Stepping motors can be pulsed many times per second and at each pulse they will rotate through a specific number of degrees. If the angular distance between pistons of the fluid wave generator is made equal to the angular distance through which the stepping motor rotates on a single pulse, the two will be matched together and will produce an exceedingly stable device. Since there is no feedback from the output to the input it is not necessary to hold the stepping motor in its position, and each step of the stepping motor will rotate the rotary valve to operate the next set of pistons with each successive pulse. If we assume that the harmonic drive has a 360 to 1 gear reduction ratio and there are 20 radial pistons, it will be evident that the pistons are 18° apart. If the input is connected with a stepping motor which rotates 18° per pulse, the motion for one pulse will be $\frac{1}{20}$ of 360° on the input and $\frac{1}{20}$ of a degree on the output. The output will then be 3 minutes of arc for each pulse of the stepping motor which is turning the rotary input valve.

(6) It will be evident that the device of the invention can be made very small, since the input drive motor can be placed on the end of the input shaft which is within the flexspline if desired. This will produce an extremely compact unit which is capable of delivering a very high torque for its size.

It will be evident that the wave generator of the invention may follow the principles previously explained in connection with wave generators, and may for example have either two lobes or three or more lobes. Where two lobes are used, the wave need not strictly be an elliptoid or a sine wave. A satisfactory form of the device can be produced by deflecting the flexspline at two opposite points and then circumferentially advancing these two opposite points. Accordingly, even though reference is made herein to the wave as a sine wave and as making an elliptoid, it will be evident that within the principles of the invention the wave forms can depart from a sine wave and the shape can depart from an elliptoid. It will, however, be understood that if desired the valve control can provide a precise sine wave although this is not usually required.

Figure 2:
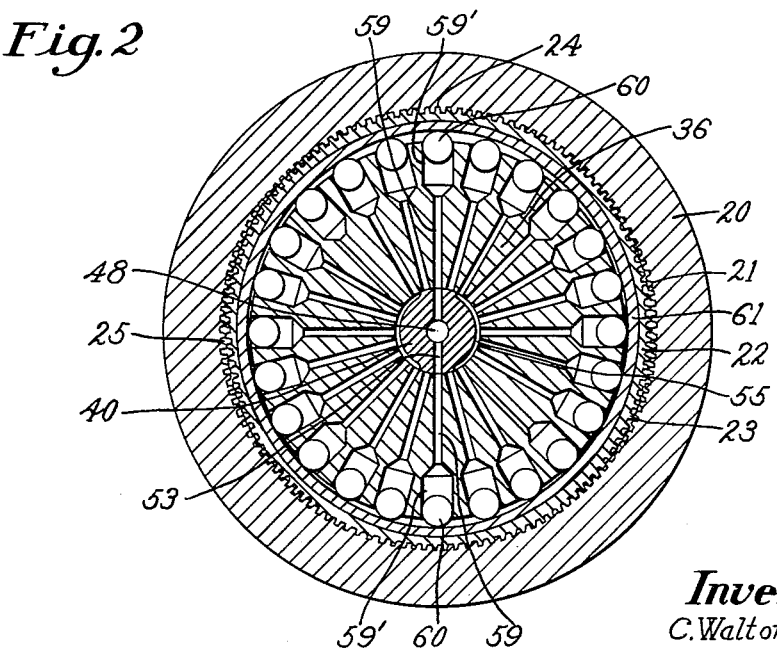
FIGURE 2 is a transverse section of the harmonic drive of FIGURE 1 along the line 2—2.

Considering first the form of FIGURES 1 to 4, the harmonic drive is enclosed within a housing 20 which has suitably cut within it at one end a circular spline 21 which is composed of a succession of involute SAE spline teeth of the character commonly used on harmonic drive units, the axis being in the plane of the paper in FIGURE 1. The teeth are arranged around the circumference in circular form as best seen in FIGURE 2. Positioned in telescoping relation within the circular spline teeth is a flexspline 22 which has distributed around its outside outwardly directed spline teeth 23 which are also involute spline teeth and are of the same circular pitch as the circular spline teeth 21.

Therefore when the flexspline 22 is deflected so that the pitch line of the flexspline teeth 23 is at the same diameter as the circular spline teeth 21, the respective teeth will intermesh properly and be in contact at points 24 opposite the lobes of the wave generator whereas at points 25 the teeth will be out of contact and out of mesh.

There will be a difference between the number of teeth of the flexspline and the number of teeth on the circular spline, as now well known in the art, which will be equal to the number of lobes of the wave generator or a multiple thereof.

The above description applies particularly to an installation in which the flexspline is on the inside and its teeth are extending radially outwardly and the circular spline is on the outside with its teeth extending radially inward, but it will be evident that the invention can equally well be applied in a reversed form where the flexspline is outside and the circular spline inside.

The flexspline as previously described is sufficiently elongated so that it can deflect elastically. The flexspline 22 is connected to an output shaft 26 by a set of cap screws 27. The output shaft extends through two output bearings 28 and 30 mounted in the housing which are held in the housing 20 by snap rings 31 and 32, as well known in mounting ball bearings. The output shaft 26 is prevented from moving axially by snap ring 33 in a suitable groove in the shaft. Enclosing the snap ring 33 and the output shaft bearing 31 is a dirt shield 34 which makes a press fit in the end of the housing 20. Also the bearings are provided with lubricant retaining shields 35.

At the opposite end of the housing 20 is positioned a valve housing 36 which is secured to housing 20 by a ring of cap screws 37. The valve housing has a central valve chamber 38 which receives a rotary valve 40. The rotary valve is axially held in place by ball bearing 41 which has an internal lubricant seal 42 and is held against a shoulder 43 on the valve by snap ring 44 in a suitable annular groove of the valve.

The outer race of ball bearing 41 is held in the recess 45 of the valve housing by cover plate 46 which is held on the valve housing by a ring of cap screws 47. Within the rotating valve 40 which actually constitutes, as herein shown, a portion of a rotating means, for example the input shaft of the harmonic drive, there is a central axial hole 48 which provides longitudinal communication between the ports. The inlet to this hole 48 is through radial hole 49 in the valve and radial hole 49 communicates with high pressure inlet port 50 and threaded opening 51 by annular groove 52 around the outside of the rotating valve 40.

The opposite end of central hole 48 connects to the high pressure radially extending valve port 53 which continues clear across the rotary valve so that the high pressure can act simultaneously at two opposite sides of the valve. The end of hole 48 is closed by a plug 54.

At circumferentially disposed positions around the valve there are low pressure return passages 55 which communicate with a circumferential groove 56 on the outside of the rotating valve and this groove connects at all times with a low pressure return port 57 connected with a threaded opening 58.

Distributed around the valve housing 36 and extending radially outwardly on the inside of the flexspline 22 is a series of diametrically opposed radial holes or passages 59 which are separate from one another and free from communication laterally. The size of the high pressure valve ports 53 is such that they exactly connect with these opposite radial holes 59 for only one set of opposed holes at any one rotational setting of the inlet valve 40. It therefore will be evident that at any one rotational setting of the rotary valve 40, the inlet fluid pressure port 50 is connected through the circumferential groove 52 through the radial hole 49, through the central hole 48 and through the high pressure valve port 53 to opposed radial holes or passages 59. Each of the pairs of radial holes or passages 59 at its outer end connects to a circumferentially spaced radially directed fluid cylinder 59' which is radially drilled into the valve housing 36 in the general axial vicinity of the center of the flexspline teeth 23.

Each of the fluid cylinders 59' has a piston 60 which preferably as shown takes the form of a ball, like the ball in a ball bearing, and which fits the wall of the cylinder 59' in liquid tight relation. It will be understood that other suitable types of pistons as well known in the art will be employed as desired, it not being intended to predicate the disclosure on the question of whether the pistons are cylinders, balls, or other suitable types of piston. It is also not intended to tie the disclosure to the question of whether or not sealing rings or piston rings are employed between the piston and the piston wall as well known in the art, and it is contemplated that if desired especially in the case of cylindrical pistons, sealing rings or piston rings will be employed if desired. The ball piston is preferred because it can engage the inside of outer race 61 which is elastic and capable of deflection by the pistons 60, and a slight rotation of the ball pistons 60 can occur as the race 61 turns, not only promoting action of the race and the balls as a ball bearing, but also permitting a lubricant film, which may be imparted from lubricant within the cylinder 59', to spread over the surface of the ball engaging the race 61.

The ball pistons 60 fit within a suitable raceway on the inside of the outer race 61, and the relationship of the ball piston 60 to the raceway 61 will suitably be similar to that of a standard ball bearing, and, considering the elliptoidal shape, is similar to the ball relationship with the outer race of a ball bearing wave generator in a harmonic drive as mentioned in the patents above referred to.

FIGURE 2 shows the interconnection of the central hole 48 with the high pressure valve port 53 and the radial holes or passages 59, the cylinders 59' and the ball pistons 60. The high pressure valve ports 53 are lined up on the vertical axis and the ball pistons 60 on the vertical axis have caused the outer race 61 to deflect elastically into an elliptoidal shape and similarly deflect the flexspline 22 and the flexspline teeth 23 into an elliptoidal shape. This causes the flexspline teeth 23 to mesh and contact with the inner teeth on circular spline 21 at the major axis, while the respective teeth at the minor axis are out of contact and out of mesh.

It will also be evident from FIGURE 2 that rotating the rotary valve 40 will cause the high pressure valve port 53 to advance to the next pair of radial holes 59 and this will displace the ball pistons 60 corresponding to said next pair of radial holes 59 so as to deflect the outer race 61 at more advanced circumferential positions, and consequently the peak of the wave or the major axis of the elliptoid will advance through an angle equal to the angle between two adjoining radial holes 59.

Figure 3:
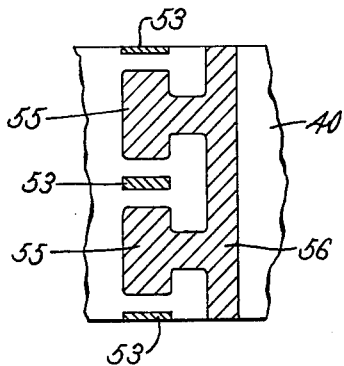
FIGURE 3 is a developed view of the surface of the rotary valve of FIGURES 1 and 2, which illustrates the configuration of the valve means.

FIGURE 3 illustrates in developed form the exterior of the rotary valve 40. This shows one suitable way for accomplishing valving. The high pressure port 53 is at two positions 180° removed and undercut passages 55 are positioned between the locations of the high pressure valve ports 53 to connect to all of the radial holes or passages 59 which are interconnected to the high pressure in the form of FIGURE 3, thus allowing the hydraulic fluid such as oil that is in the fluid cylinders 59' not subjected to the high pressure to return through the radial holes 59 to the low pressure line. These undercut passages 55 are connected to a circumferential groove 56, which, as described earlier, connect to the low pressure outlet for the system.

While in the particular device illustrated the width of the high pressure valve port 53 and the land on each side of it approximately equal the diameter of one of the radial holes or passages 59 and the distance between such radial holes respectively, it will be evident that under certain particular conditions it may be desired to have more than two opposite pistons deflecting the flexspline at any one time so as to produce extended contact of the flexspline as previously described in the patents above referred to. Thus under such conditions the high pressure valve port 53 would then be made to cover more than one radial hole 59 and as a consequence there would be an area of contact of the flexspline teeth with the circular spline at the major axis. The shape of the flexspline would no longer be an elliptoid but instead would be similar to the shape in United States Patent No. 2,930,254 for Extended Contact.

While in the specific embodiment of FIGURES 1 to 2 the high pressure valve ports 53 are located 180° apart, providing for 2 lobes on the wave generator, it will be evident that as referred to in the patents above mentioned, other numbers of lobes such as 3 lobes can be used and in that case of course there will be 3 ports 53 distributed around the circumference with 3 undercut passages 55 between them. It will of course be evident that in the 3 lobe form the shape of the flexspline will not be elliptoidal but will be moderately triangular with 3 lobes and 3 points of tooth interrelationship and 3 other points in which the teeth are fully separated.

Figure 4:
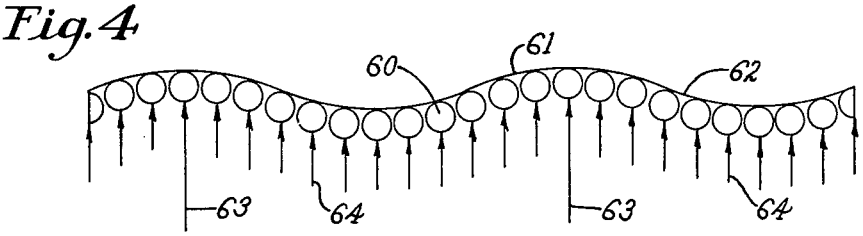
FIGURE 4 is a diagrammatic developed view illustrating the wave form in an elliptoidal wave generator and showing the fluid or hydraulic pressures applied at the defferent points around the wave generator.

Assuming a 2 lobe form, FIGURE 4 illustrates diagrammatically the wave shape of the various ball pistons 60 which lie against the raceway 62 of the outer race 61. The ball pistons 60 which are interconnected to the high pressure are represented by elongated arrows 63 at the major axis which correspond to the peak of the wave. All the rest of the ball pistons 60 are connected to the low pressure as indicated by arrows 64 which are suitably alike.

In operation of the device, it is now obvious that the high pressure is connected to the threaded opening 51 and the low pressure line is connected to the threaded opening 58.

In the preferred embodiment the low pressure 64 will not be substantially atmospheric pressure but will be moderate back pressure above atmospheric so that the ball pistons 60 will remain in actual physical contact with the raceway 62 of the outer race 61 to maintain favorable bearing support. The particular back pressure used will depend upon the tightness of fit of ball pistons 60 with their cylinders 58 and also upon the speed or rotation of the rotary valve 40. If the rotary valve 40 turns at a high rotational speed, this will cause the ball pistons 60 to move back and forth in their cylinders 58 at a relatively high speed and the back pressure (that is, the low pressure) connected to the outlet threads 58 should be sufficiently high to assure that the ball pistons 60 will always remain in contact with the raceway 62 of the outer race 61, although, of course, the back pressure will be substantially lower than the high pressure 63.

With high pressure connected to the high pressure inlet 50 and back pressure connected to the low pressure outlet port 57, it will be evident that the high pressure will communicate with the holes 59 through the high pressure valve port 53 and cause at least two opposite pistons 60 to deflect the flexspline 22 so that the flexspline teeth 23 will be in contact at spaced points with the circular spline teeth 21 while at intervening points the flexspline teeth will be out of contact and out of mesh. As the input shaft or rotary valve 40 is rotated so that the high pressure inlet port 53 connects with adjacent radial holes or passages 59, this will cause the ball pistons 60 in their respective cylinders 59' to deflect the flexspline 22 at rotationally advanced spaced points so that the teeth 21 of the flexspline will rotationally progress in their interengagement. In essence this has caused the major axis of the elliptoid (where 2 lobes and an elliptoidal shape are used) to advance circumferentially the same amount and in the same direction as the rotation of the rotary valve 40. At the same time that the ball pistons 60 at the point of deflection are moving outwardly radially, other ball pistons move radially inwardly and this is possible since the passageways or radial holes 59 are connected to the undercut passageways 55 which in turn connect to the annular groove 56 and to the outlet port 57.

As the major axis of the rotating shape advances to the next set of ball pistons 60, this causes an angular rotation of the output shaft 26. The amount of this angular rotation of the output shaft 26 in relation to the rotation of the rotary valve 40 is dependent upon the ratio of the harmonic drive unit or the relative number of teeth of the circular spline 21 and the flexspline 22. Therefore, the rotation of the output shaft 26 is completely responsive to the rotation of the rotary valve 40 as long as high pressure supply takes place to the rotary valve 40. Continued rotation of the rotary valve 40 in either direction will produce desired angular motion of the output shaft 26 in either direction depending upon the gear ratio.

Figure 5:
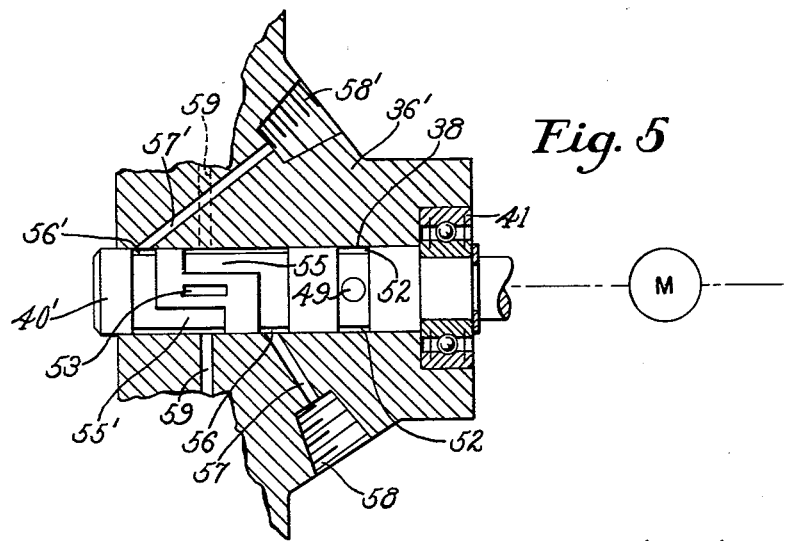
FIGURE 5 is an axial section of a modification of the form of FIGURES 1 to 4 in which an intermediate pressure is applied in conjunction with a high and low pressure. The view is fragmentary and shows only the rotary valve and its port arrangement.

FIGURE 5 illustrates a variation in the valve and valve housing.

There are times when it is desired to add additional support to the flexspline. When the shape of the flexspline is obtained solely by two points at the major axis, the load carrying capacity is somewhat limited. In order to increase the load carrying capacity, it is desirable to apply an intermediate pressure between the high pressure and the low pressure so as to maintain the desired elliptoidal shape of the outer race 61 and the flexspline 22. To accomplish this purpose, minor modifications are made in the construction of the rotary valve 40' of FIGURE 5. Here there are the same high pressure ports 53 connected exactly as they were in the previous embodiment. Instead, however, of having only one return line, the rotary valve 40' has two return lines, and one of these is at an intermediate pressure while the other is at the low pressure, although it may be a moderate back pressure. With the high pressure line and connections identical with that previously described, provision is made in FIGURE 5 for an intermediate pressure and a low pressure connection. Strictly for the purpose of identifying the passageways, they may be referred to as clockwise and counterclockwise passageways, since the direction in which the rotary valve 40' turns determines which of the passageways 55 and 55' should be the intermediate pressure passageway and which one should be the low pressure passageway. For example, the counterclockwise intermediate pressure passageways 55' shown on the rotary valve 40' are illustrated as being at the opposite side of the high pressure valve port 53. These counterclockwise intermediate pressure passageways 55' communicate with a circumferential groove 56' which in turn communicates with the counterclockwise intermediate pressure inlet 57' which in turn communicates with a threaded opening 58'. The clockwise intermediate pressure passageways 55 communicate with the circumferential groove 56 which in turn communicates with the clockwise inlet 57. One of the ports 57 or 57' will be connected to intermediate pressure and the other will be connected to low pressure. Whichever one of these ports 57 is connected to intermediate pressure, the other is connected to low pressure and the direction of rotation determines which is which. One of these will function as the intermediate pressure connection when rotation is clockwise and when rotation is counterclockwise this will function as the low pressure connection.

Figure 6:
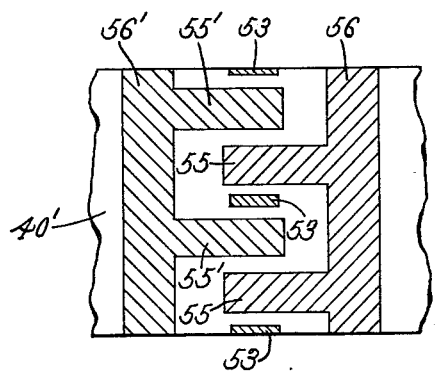
FIGURE 6 is a developed view of the external surface of the rotary valve of FIGURE 5.

FIGURE 6 shows the interrelation of these passageways suitably developed. This arrangement is for a 2 lobe elliptoidal form, and a greater number of lobes may be used if desired.

Figure 7:
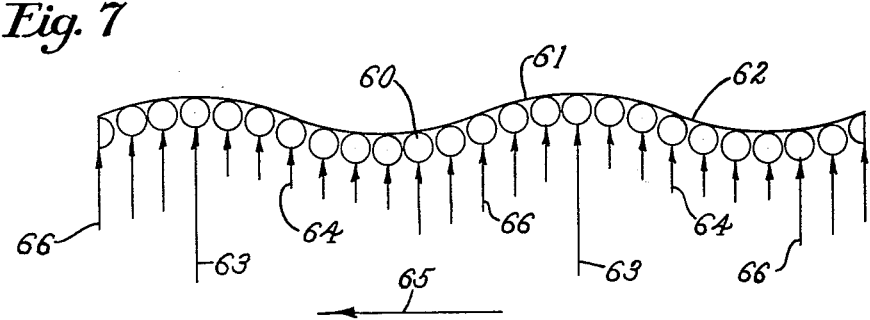
FIGURE 7 is a diagrammatic developed view of the wave form produced with the valve of FIGURES 5 and 6, showing the relative positions at which high, medium and low pressures are applied for one direction of rotation, counterclockwise.

FIGURE 7 shows diagrammatically and suitably developed the relationship of the ball pistons 60 with the raceway 62. For counterclockwise rotation as shown by arrow 65, the high pressure is shown by arrow 63 which as indicated are located at the major axis of the elliptoid. The intermediate pressure is indicated by arrows 66, the intermediate pressure arrows being located forwardly of the high pressure arrows in the direction of rotation and the low pressure arrows 64 being in the trailing position with respect to the high pressure arrows 63. These various arrows as in FIGURE 4 show the relative pressures on the various pistons.

Figure 8:
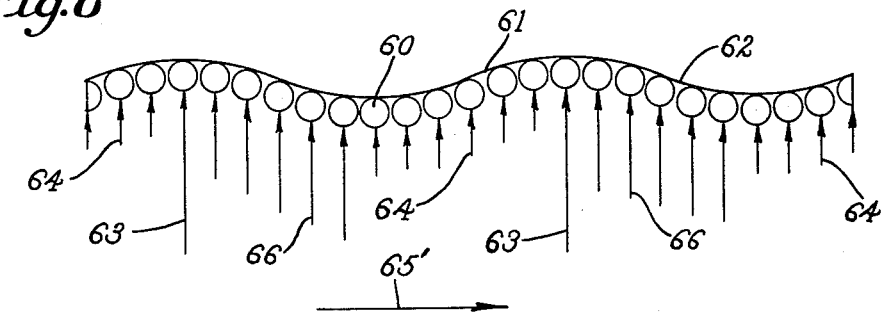
FIGURE 8 is a view similar to FIGURE 7 showing the relations of the pressures and the wave form when the unit is operating clockwise.

FIGURE 8 shows the relationships of the high pressure, low pressure and intermediate pressure arrows for clockwise rotation as shown by arrow 65'. The relationship of the intermediate and low pressure arrows has been reversed with respect to that of FIGURE 7.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. A harmonic drive having a circular spline provided with circumferentially distributed teeth, and a flexspline provided with circumferentially distributed teeth adapted to cooperate with those on the circular spline, the circular spline and the flexspline being one within the other, there being a difference in the number of teeth on the circular spline and the flexspline which is the same or a multiple of the number of contact points between the circular spline and the flexspline, in combination with a fluid wave generator including radially acting fluid means distributed around the side of the flexspline remote from the circular spline and adapted to deflect the teeth of the flexspline into contact with the teeth of the circular spline, and valve means for applying fluid pressure to said radially acting fluid means at a plurality of circumferentially spaced positions and for successively energizing certain of said radially acting fluid means at said circumferentially spaced positions and deenergizing others of said fluid means at intermediate positions to propagate a wave of deflection around said flexspline.

2. A harmonic drive of claim 1, in which said radially acting fluid means comprise cylinder and piston combinations acting on said flexspline.

3. A harmonic drive of claim 2, in which said cylinders are stationary.

4. A harmonic drive of claim 2, in which said pistons comprise balls acting radially against said flexspline.

5. A harmonic drive of claim 4, in which there is a race interposed between said balls and said flexspline, and said balls engage said race.

6. A harmonic drive of claim 5, in which said fluid means includes lubricant means for said balls.

7. A harmonic drive of claim 1, in combination with valve means connected to said others of the radially acting fluid pressure means for providing low pressure return.

8. A harmonic drive of claim 1, in which said flexspline is within said circular spline, said radially acting fluid pressure means are within said flexspline and comprise cylinders and balls, a race is interposed between said balls and said flexspline and said balls act against the inside of said race.

9. A harmonic drive of claim 1, in which said valve means is the input.

10. A harmonic drive of claim 1, in combination with fluid acting means for maintaining back pressure lower than said fluid pressure on said radially acting fluid means other than those on which said fluid pressure is applied.

11. A harmonic drive of claim 1, in combination with valve means for applying an intermediate pressure to the radially acting fluid pressure means which are ahead in the direction of progression of those at which said fluid pressure is applied and for applying low pressure to those radially acting fluid means which are behind in the direction of progression those to which said fluid pressure is applied.

12. A harmonic drive of claim 1, in combination with intermittently operable means to advance said valve means.

13. A device of claim 1, in which upon release of said fluid pressure said teeth of the flexspline are radially clear of said teeth of the circular spline.

14. A harmonic drive, having a circular spline with teeth on the inside thereof, a flexspline with teeth on the outside thereof within the circular spline, a wave generator race within the flexspline and acting radially against it, a series of radially extending cylinders distributed around the circumference on the inside of the race directed outwardly, balls in said cylinders acting as pistons therein and engaging the inside of said race, valve means for applying fluid pressure simultaneously to the ball pistons at a plurality of circumferentially spaced points and deflecting the flexspline into contact of its teeth with the circular spline at spaced points while the teeth of the flexspline are out of contact and out of mesh with the teeth of the circular spline at intermediate points, the difference in the number of teeth between the circular spline and the flexspline being the same or a multiple of the number of spaced points at which the teeth of the flexspline are in contact with the teeth of the circular spline and means for rotating said valve means to apply a wave of deflection around said flexspline.

15. A harmonic drive of claim 14, in combination with valve means for withdrawing fluid from the cylinders located at points at which the flexspline teeth are not in engagement with the circular spline teeth.

16. A harmonic drive of claim 15, in which pressure below said fluid pressure but above atmospheric pressure is maintained on the cylinders at points where the teeth of the flexspline are not in contact with those of the circular spline.

17. A harmonic drive of claim 16, in combination with valve means for applying an intermediate pressure to the cylinders which are located ahead of the cylinders to which said fluid pressure is being applied in the direction of wave progression, said low pressure being applied to the cylinders which are behind the cylinders to which said fluid pressure is being applied in the direction of wave progression.

18. A harmonic drive having a circular spline provided with circumferentially distributed teeth, and a flexspline provided with circumferentially distributed teeth adapted to cooperate with those on the circular spline, the circular spline and the flexspline being one within the other, there being a difference in the number of teeth on the circular spline and the flexspline which is the same or a multiple of the number of contact points between the circular spline and the flexspline, in combination with a fluid actuated wave generator including radially acting means distributed around the side of the flexspline remote from the circular spline and adapted progressively to deflect the teeth of the flexspline into contact with the teeth of the circular spline to propagate a wave of deflection around said flexspline.

References Cited in the file of this patent
UNITED STATES PATENTS
3,005,358    Musser _____ Oct. 24, 1961